Jan. 24, 1939.  R. H. BOOK  2,144,960
HARROW CONSTRUCTION
Filed Feb. 11, 1938   2 Sheets-Sheet 1
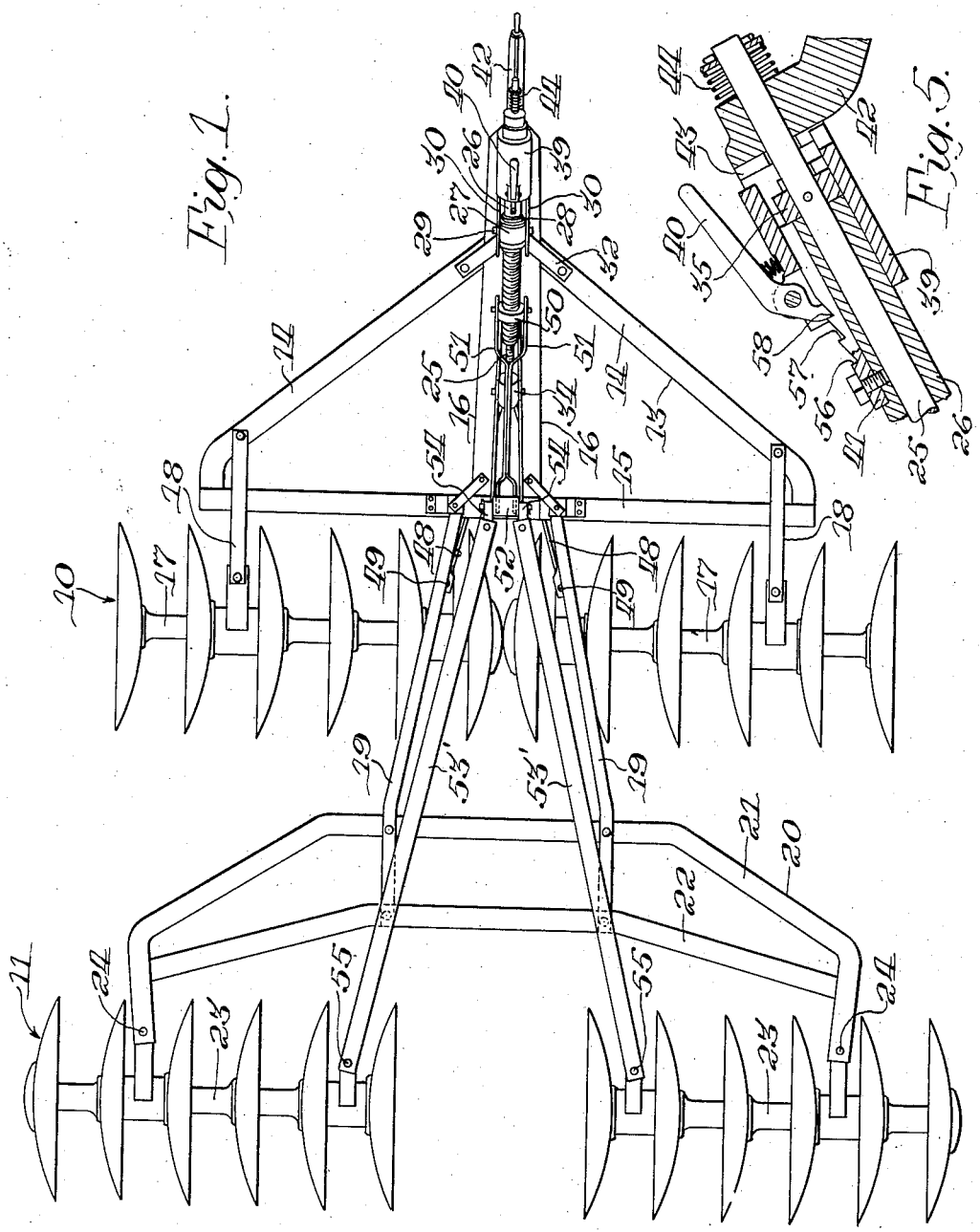
Inventor
Raymond H. Book
By V. F. Lassagne
Atty.

Jan. 24, 1939.  R. H. BOOK  2,144,960
HARROW CONSTRUCTION
Filed Feb. 11, 1938  2 Sheets-Sheet 2
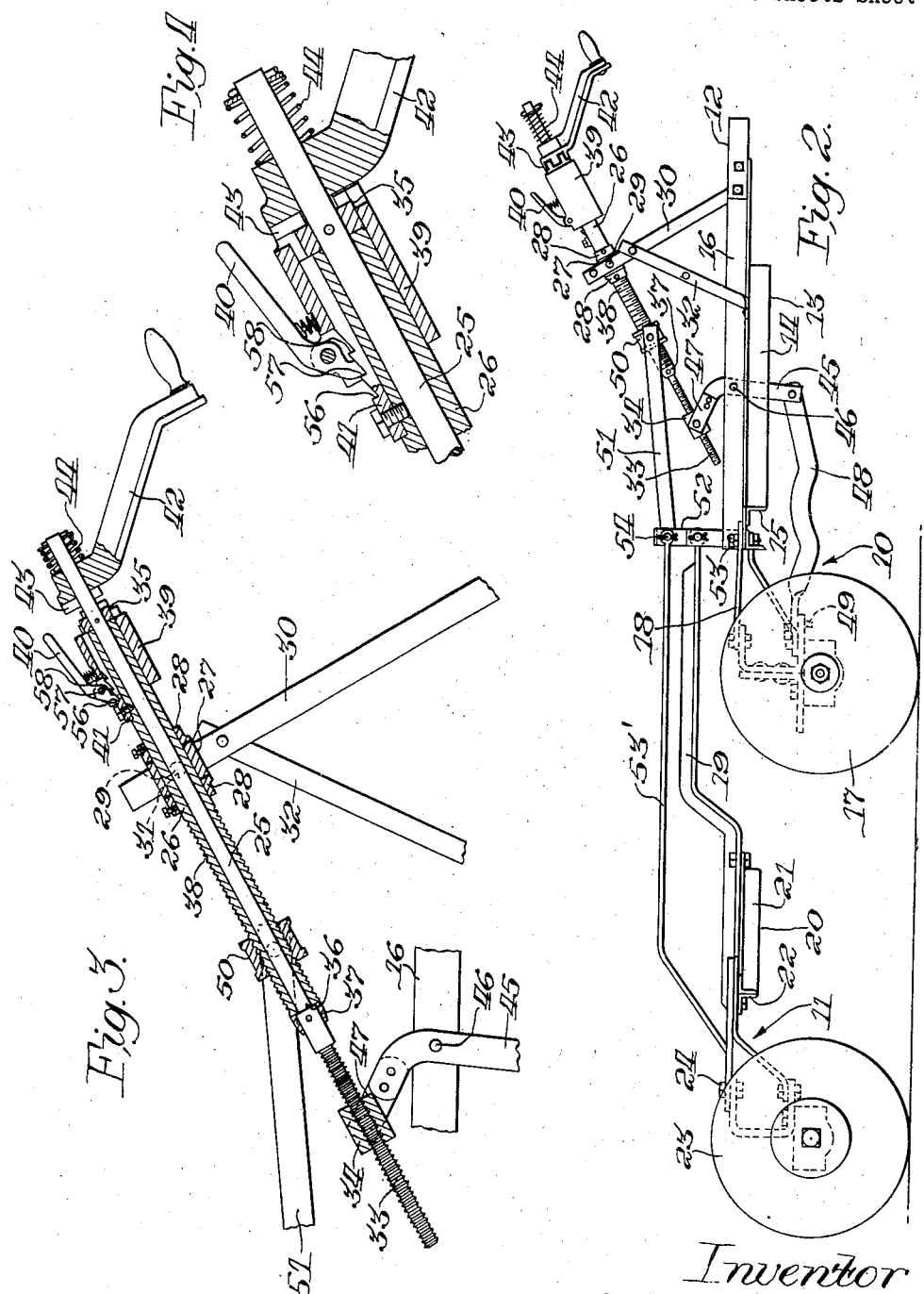
Inventor
Raymond H. Book
By *U. F. Lasagne*
Atty.

Patented Jan. 24, 1939

2,144,960

UNITED STATES PATENT OFFICE 2,144,960

HARROW CONSTRUCTION

Raymond H. Book, Rock Falls, Ill., assignor to International Harvester Company, a corporation of New Jersey Application February 11, 1938, Serial No. 189,927

17 Claims. (Cl. 55—83)

This invention relates to a disk harrow construction. More particularly it relates to a device for controlling separately or together the front and rear gangs of a disk harrow.

In harrows composed of a pair of units mounted in tandem relation on each of which a pair of adjustable gangs is mounted, it is sometimes desirable to adjust the pairs of gangs of both units simultaneously and at other times to adjust each pair of gangs independently. Up to the present time, harrow constructions have been devised which permit the simultaneous adjustment of the pairs of gangs of both units. There are other constructions which permit the adjustment of the pairs on the units independently of one another by means of separate control members. No one of these devices, however, allows both the simultaneous adjustment of the pairs of gangs of both units as well as the independent adjustment of each pair. Furthermore none of these devices permits the separate adjustment of each pair by means of a single control member.

The principal object of this invention is, accordingly, to provide a means which will allow either the simultaneous adjustment of the pairs of gangs of a pair of harrow units connected in tandem relation, as well as the independent adjustment of the pairs on each unit.

A further object is the provision of a device for the simultaneous and independent adjustment of the gangs of a pair of harrow units which is mounted on the frame of one of the units.

Another object is to provide a unitary and compact device for the simultaneous and independent adjustment of the gangs of a pair of connected harrow units.

A further object is the provision of a device which will permit the separate adjustment of harrow gangs by means of a single control member.

Another object is the provision of a harrow construction which will permit the separate or simultaneous adjustment of harrow gangs by means of a single actuating member.

A further object is to provide a harrow construction including adjustable gangs which may be separately or simultaneously adjusted.

Other objects will be apparent from the disclosure.

In the drawings—

Figure 1 shows a plan view of a pair of harrow units connected in tandem relation;

Figure 2 shows a side view of the same;

Figure 3 shows in detail the novel device for adjusting the gangs of the harrow units in position for adjustment of the gangs of the front unit;

Figure 4 shows the device in position for adjustment of the gangs of both units simultaneously; and, Figure 5 shows the device in position for the adjustment of the gangs of the rear unit.

As seen in Figures 1 and 2, there is a harrow composed of a front unit 10 and a rear unit 11 connected in tandem relation and adapted to be pulled behind a tractor, not shown, by means of a clevis 12. The front harrow unit has a frame 13 carrying the clevis 12 and consists of a bowed member 14, a cross member 15 connected adjacent the ends thereof, and a pair of longitudinally extending members 16 connecting the mid-sections of the members 14 and 15 and receiving at their extremity the clevis 12. A pair of gangs 17 is pivotally attached adjacent the ends of the bowed member 14 by means of links 18. A pair of connecting members 19 extend rearwardly from the front frame and are joined to a rear frame 20. This rear frame consists of a bowed member 21 and a cross member 22. A pair of gangs 23 is pivotally attached to the ends of the member 21, as at 24.

The novel device for adjusting the gangs of the units will now be described. A bolt 25 is carried within a sleeve 26, in turn held within a trunnion member 27 kept in a particular longitudinal position by set collars 28. The trunnion member 27 is held between a pair of members 30 by means of projections 29 on the trunnion member in recesses 31 in the members 30. The lower ends of the members 30 are held between the longitudinally extending members 16. Braces 32 extend between the member 14 and the members 30. One end of the bolt 25 has a threaded section 33 which carries a nut 34. A clutching collar 35 is fixed near the opposite end of the bolt. The sleeve 26 is held in a fixed position longitudinally of the bolt between the clutching collar 35 and a shoulder 36 adjacent the threaded section 33 and collar 37 carried on the shoulder. The sleeve, in turn, has a threaded section 38 and carries adjacent the clutching collar 35 of the bolt, an adjustable clutching collar 39. This collar is held in any one of three longitudinal positions upon the sleeve 26 by means of a pawl member 40 mounted on the collar 39 and a notched key 41 fixed to the sleeve 26. A crank member 42 is mounted on the end of the bolt 25 adjacent the clutching collars 35 and 39 and has a clutching section 43 adapted to engage the clutching collars 35 and 39. A spring 44 urges the clutching section toward the clutching collars.

A lever 45 is pivoted at 46 between the longitudinally extending member 16 and is connected at one end to the nut 34 on the bolt 25 by means of clevis members 47. A pair of links 48 are attached to the opposite end of the lever 45 and are joined to the inner ends of the gangs 17, as at 49.

The nut 50 is carried on the threaded section 38 of the sleeve 26. Members 51 connect the nut and one end of an upstanding member 52 pivotally attached, as at 53, to the longitudinally extending member 16. Links 53' are attached at one end, as at 54, to the upstanding member 52 and at the other end, as at 55, to the inner ends of the rear gangs.

From the above description, it will be apparent that a turning of the bolt 25 will cause a movement longitudinally thereof of the nut 34 and a consequent adjustment of the gangs 17 of the front unit through the lever 45 and the links 48. Similarly, a turning of the sleeve 26 will cause a longitudinal movement of the nut 50 and a consequent adjustment of the gangs 23 of the rear unit through the links 51 and 53'. The threaded sections of the bolt and sleeve carry right hand threads. Consequently, a clockwise turning of the bolt and sleeve, when viewed from the crank end, will cause the nuts 34 and 50 to move toward the crank and the gangs to swing from the alined position of Figure 1 to an angled position with the inner ends of the front gangs moved rearwardly and the inner ends of the rear gangs moved forwardly.

As previously described, the sleeve 26 carries an adjustable clutching collar 39. This collar may be held in any one of three positions on the sleeve by means of the pawl 40, which may fit into any one of three notches 56, 57 and 58 in the key 41 fixed to the sleeve 26. As shown in Figure 3, the pawl engages the end notch 56 and the clutching collar 35 extends out beyond the clutching collar 39 so that the clutching section of the crank 42 engages only the clutching collar 35. Thus, if the crank is turned, only the bolt 25 will rotate and consequently only the gang 17 of the front harrow unit will be moved.

Figure 4 shows the pawl 40 engaging the middle notch 57 in the key 41. In this position, the clutching section of the crank engages both of the clutching collars on the sleeve and the bolt. Thus, turning of the crank will cause a rotation of both the sleeve and the bolt and a resultant movement of the gangs of both front and rear harrow units.

Figure 5 shows the pawl 40 in the end notch 58 in the key 41. In this position, the collar 39 extends beyond the collar 35, and consequently, the clutching section of the crank engages only the collar 39. Thus a turning of the crank will produce rotation of the sleeve and a consequent movement of the gangs 23 of the rear harrow unit.

From the foregoing description, it is seen that an arrangement of parts has been devised, such that either joint or separate angling of the gangs of both units may be accomplished by a single crank.

It will be apparent that the novel adjusting device is not limited in its use to the particular harrow structure illustrated, but may be applied wherever joint or separate angling of the gangs of a harrow is desirable.

It is intended to limit the invention only within the terms of the appended claims.

What is claimed is:

1. The combination with two disk harrow units connected in tandem relation and including frames and adjustable gangs and a device carried by each harrow unit for adjusting the gangs, of means including a single autuating element and a shiftable clutch element movable to engage either one of said gang adjusting devices separately or both of the devices together.

2. In a disk harrow construction comprising front and rear disk harrow units connected in tandem relation and including frames and adjustable gangs and a device carried by each harrow unit for adjusting the gangs, the combination with said harrow units and adjusting devices, of an operating means for said adjusting devices mounted on the front frame, comprising a bolt having a threaded section at one end for connection with the adjusting device on the front unit and a clutching section at the other end, a sleeve around the bolt having a threaded section at one end for connection with the adjusting device on the rear frame and an adjustable clutching section at the other end adjacent the clutching section of the bolt, and a crank slidably mounted on the bolt and having a clutching section engageable with the clutching sections of the bolt and/or the sleeve for operating the adjusting devices for the front unit and for the rear unit.

3. In a disk harrow construction comprising front and rear units connected in tandem relation and including frames and adjustable gangs, the combination with said harrow units with a device mounted on the front frame for adjusting said gangs comprising a bolt having a threaded section at one end operatively connected with the gangs of the front unit and the clutching section at the other end, a sleeve around the bolt having a threaded section at one end operatively connected with the gangs of the rear unit and an adjustable clutching section at the other end adjacent the clutching section of the bolt, and a crank mounted on the bolt and having a clutching section engageable with the clutching sections of the bolt and/or the sleeve for adjusting the gangs of the front and/or the rear unit.

4. In a disk harrow construction comprising two harrow units connected in tandem relation and including frames and adjustable gangs, the combination with said harrow units of a device mounted on one of the frames for adjusting said gangs comprising a bolt having a threaded section at one end for connection with the gangs of one unit and a clutching section at the other end, a sleeve around the bolt having a threaded section at one end for connection with the gangs of the other unit and an adjustable clutching section at the other end adjacent the clutching section of the bolt, and a crank slidably mounted on the bolt and having a clutching section engageable with the clutching sections of the bolt and/or the sleeve for adjusting the gangs of either one or both of the units.

5. In a disk harrow construction comprising a pair of harrow units connected in tandem relation and including frames and adjustable gangs, the combination with said harrow units, of a device for adjusting the gangs comprising a first rotatable element mounted on one of the frames and operatively connected to the gangs of one unit, a second rotatable element mounted on the same frame and operatively connected to the gangs of the other unit, and an actuating lever engageable with either one or both of the elements for rotating the same to effect adjustment of the gangs of either one or both of the units.

6. In a disk harrow construction comprising a pair of harrow units connected in tandem relation and including frames and adjustable gangs, the combination with said harrow units of a device for adjusting the gangs comprising a first element operatively connected to the gangs of one unit and having a clutching section, a second element mounted on the same axis as the first element and operatively connected to the gangs of the other unit and having an axially adjustable clutching section, and an actuating member having a clutching section engageable with either one or both of the clutching sections of the elements dependent on the axial position of the adjustable clutching section of the one element.

7. The combination with two disk harrow units connected in tandem relation and including frames and adjustable disk gangs, of dual means unitarily mounted on one of the harrow units concentrically about a common axis and independently rotatable to adjust the gangs of one harrow unit independently of those of the other, and an actuating means selectively engageable with either one or both of the dual means for adjustment of the gangs of one unit independently of those of the other or for simultaneous adjustment of the gangs of both units.

8. A disk harrow construction comprising two disk harrow units connected with one another and including frames and adjustable disk gangs, rotatable devices mounted on one of said frames and operatively connected, one with the gangs of one unit and the other with those of the other, and an actuating means selectively engageable with either one or both of the devices to adjust the gangs of either one or both of the units.

9. In a harrow construction, a pair of harrow units connected to one another and including frames and sets of adjustable gangs, coaxially mounted devices connected to the gangs of separate harrow units, and an actuating means engageably selected with either one or both of the devices for adjusting either one or both of the sets of gangs.

10. A harrow construction comprising a pair of adjustable gangs, a pair of adjusting devices connected to the gangs, and an actuating member engageable with either one or both of the adjusting devices for adjustment of either of the gangs separately or both of the gangs simultaneously.

11. A harrow construction comprising a pair of adjustable gangs, a pair of coaxially mounted adjusting devices connected with the gangs, and an actuating member mounted coaxially with the adjusting devices and engageable with either one or both of said devices for adjustment of either of the gangs separately or both of the gangs simultaneously.

12. A harrow construction comprising a pair of adjustable gangs, a rotatable adjusting device connected to one of the gangs and having a clutching section, a second rotatable adjusting device connected to the other gang and having a movable clutching section, and an actuating member selectively engageable with either one or both of the clutching sections of the devices dependent upon the position of the movable clutching section for the adjusting of either of the gangs separately or both of the gangs simultaneously.

13. A harrow construction comprising a pair of adjustable gangs, a pair of coaxially mounted rotatable devices connected to said gangs, one of said devices having an adjustable section, and an actuating member coaxially mounted with respect to said adjusting devices and engageable selectively with either or both of said devices dependent upon the position of the adjustable section of the one device for adjustment of either of the gangs separately or both of the gangs simultaneously.

14. A harrow construction including a pair of adjustable gangs and a single actuating member selectively operatively engageable with either or both of the gangs for separate or joint adjustment thereof.

15. A harrow construction including a pair of adjustable gangs, a pair of coaxially positioned adjusting devices connected to the gangs, and an actuating member selectively engageable with either of the adjusting devices for separate adjustment of the gangs.

16. A harrow construction including a pair of adjustable gangs, a pair of coaxially mounted adjusting devices connected to the gangs, and an actuating member selectively engageable with either of the adjusting devices for separate adjustment of the gangs.

17. A harrow construction including a pair of adjustable gangs, a pair of coaxially mounted adjusting devices, one of which has an adjustable section, and an actuating member selectively engageable with either one or the other of the adjusting devices dependent upon the position of the adjustable section of the one adjusting device.

RAYMOND H. BOOK.